United States Patent
Kopmels

(10) Patent No.: US 8,052,389 B2
(45) Date of Patent: Nov. 8, 2011

(54) INTERNALLY COOLED AIRFOILS WITH LOAD CARRYING MEMBERS

(75) Inventor: Michiel Kopmels, Bristol (GB)

(73) Assignee: Rolls-Royce PLC, London (GB)

( * ) Notice: Subject to any disclaimer, the term of this patent is extended or adjusted under 35 U.S.C. 154(b) by 551 days.

(21) Appl. No.: 11/207,869

(22) Filed: Aug. 22, 2005

(65) Prior Publication Data
US 2007/0286729 A1   Dec. 13, 2007

(30) Foreign Application Priority Data
Aug. 25, 2004 (GB) ................................ 0418906.4

(51) Int. Cl.
*F01D 5/18* (2006.01)
(52) U.S. Cl. .................... 416/96 R; 416/97 R; 416/233
(58) Field of Classification Search .......... 415/115–116; 416/95, 96 R, 96 A, 97 R, 233
See application file for complete search history.

(56) References Cited

U.S. PATENT DOCUMENTS

| | | | | |
|---|---|---|---|---|
| 2,991,973 A | * | 7/1961 | Cole et al. | 416/97 R |
| 3,067,982 A | * | 12/1962 | Wheeler, Jr. | 416/90 R |
| 3,921,271 A | | 11/1975 | Dennis et al. | |
| 5,193,980 A | | 3/1993 | Kaincz et al. | |
| 5,971,708 A | | 10/1999 | Lee | |
| 6,126,396 A | * | 10/2000 | Doughty et al. | 416/97 R |
| 6,672,836 B2 | * | 1/2004 | Merry | 416/97 R |
| 6,955,523 B2 | * | 10/2005 | McClelland | 415/115 |
| 2003/0047298 A1 | | 3/2003 | Tiemann | |

FOREIGN PATENT DOCUMENTS

| | | |
|---|---|---|
| DE | 103 33 304 A1 | 2/2005 |
| EP | 0 926 313 A1 | 6/1999 |
| EP | 0 990 771 A1 | 4/2000 |
| EP | 1314855 A2 * | 5/2003 |
| GB | 731 161 | 6/1955 |
| GB | 778672 | 7/1957 |
| JP | A 60-135605 | 7/1985 |
| JP | A 61-205301 | 9/1986 |

OTHER PUBLICATIONS

Partial English Translation of JP 61-205,301, published Sep. 11, 1986.*
Sep. 23, 2009 European Search Report issued in EP 05 25 5153.

* cited by examiner

*Primary Examiner* — Christopher Verdier
(74) *Attorney, Agent, or Firm* — Oliff & Berridge, PLC

(57) ABSTRACT

A shroudless, air cooled gas turbine blade has an internal structure including load-carrying members that support the blade outer wall and divide the blade interior into cooling passages. The dimensions of the structure in particular the load-carrying members are chosen with respect to inward heat flow during operation to tend to reduce heat transfer from the outer wall to the load-carrying members and with respect to mass distribution in the structure to reduce centrifugal forces during operation.

14 Claims, 3 Drawing Sheets

INTERNALLY COOLED AIRFOILS WITH LOAD CARRYING MEMBERS

BACKGROUND

The invention relates to internally cooled aerofoils.

In particular it concerns the design of the internal structure of an internally cooled turbine aerofoil for a gas turbine propulsion engine.

The surface temperature of the aerofoils in the high pressure turbine of a gas turbine engine can reach the melting point of the alloy of which they are constructed. Hence heat is extracted by passing cooling air through passages formed in the interior or in the walls of the aerofoil. Known methods of casting internally cooled turbine aerofoils use ceramic cores that have been manufactured in a die. Consequently the shapes of the internal wells, or webs, that define the internal cooling passages are constrained by the requirements for die draw/withdrawal angles. The webs of the internal structure of aerofoils containing multiple cooling passages have been made thinner either in the middle or on one side of the blade, depending on the complexity of the die. Examples of internal structures of this kind are illustrated at FIGS. 1 and 2.

These designs suffer a drawback in that the shape of the internal webs forming the internal support structure for the aerofoil outer wall have been optimised for the ease of manufacture of the ceramic core or the aerofoil rather than for maximum aerofoil life.

Japanese Patent No. JP 60135605 entitled "Turbine Blade Cooling" published in 1985 disclosed an internally cooled turbine blade in which internal walls, webs, partitioning flow passages in the interior of the blade are made into convex forms. This convex form reduces the cross-sectional area of the flow passage, compared to the same blade in which the partition walls are not convex, resulting in increased flow speed in the passage and increased coefficient of heat transfer by convection. The chordal extent of the convex webs appears substantially constant along the length of the flow passage. Notwithstanding increased heat extraction, increased mass in a rotating component at high radius will adversely affect the creep resistance of the blade and this may be a limiting factor in blade life. This might be the case where engine weight is important as in an aircraft propulsion engine.

Japanese Patent No. JP 61205301 entitled "Gas Turbine Blade" teaches an arrangement to dissipate the unevenness in the temperature of a gas turbine blade in which a fluid cooling passage is formed. The sectional area of the cooling passage is smaller in the mid-height part of the blade than in the root and tip regions. The partition walls between flow passages are provided with projecting parts, or ribs, to enhance heat transfer. This arrangement is designed only with regard to the distribution of temperature in the external turbine gas flow.

SUMMARY

The design of the cross-section of a turbine blade, that is, the internal structure inside the envelope of the outer wall, is governed by the permitted stress in the material and by the size of the core passages required for cooling purposes. The operating temperatures of the blades dictate the need to cool them internally, in the case of aircraft propulsion engines that means using cooling air derived from the engine itself. Where system weight is not critical, such as in land-based or marine power systems, other heavier cooling such as water or steam may be used. However, cooling flow is detrimental to overall engine performance and to mitigate that the flow is regulated very carefully and material choice and internal blade design is very important. Although the blades glow red-hot during engine running they must retain sufficient strength to carry high centrifugal loads due to their rotation and the bending loads exerted by the force of the gas stream. Over a period of time in use the length of a turbine blade slowly but inevitably increases—a phenomenon known as creep. Thus, creep life is a major factor dictating the finite useful life limit of a turbine blade. Generally creep increases, or creep resistance decreases, with higher blade operating temperatures. But at a given operating temperature weight is also important so a blade with poor weight distribution will exhibit increased creep shortening its useful life. A primary objective of the present invention is to balance these factors to the benefit of blade life.

According to the invention, an internally cooled gas turbine aerofoil comprises a foot adapted for mounting on a disc, and rises in a radial direction from said foot a hollow aerofoil profiled section consisting of an outer wall defining pressure and suction surfaces, wherein the outer wall is supported by an internal structure including load carrying members carried by or formed integrally with said foot portion that divide the interior cavity of the aerofoil section into a plurality of cooling passages, the dimensions of the internal structure are chosen with respect to inward heat flow during operation to tend to reduce heat transfer from the outer wall to the load carrying members and with respect to mass distribution in the structure to reduce centrifugal forces during operation.

The load carrying members are thinnest adjacent the inner surfaces of the outer wall and thickest about mid-way between the pressure and suction surfaces.

BRIEF DESCRIPTION OF THE DRAWINGS

The invention and how it may be carried into practice will now be described, by way of example, with reference to the accompanying drawings, in which.

DETAILED DESCRIPTION OF EMBODIMENTS

Figure 1:
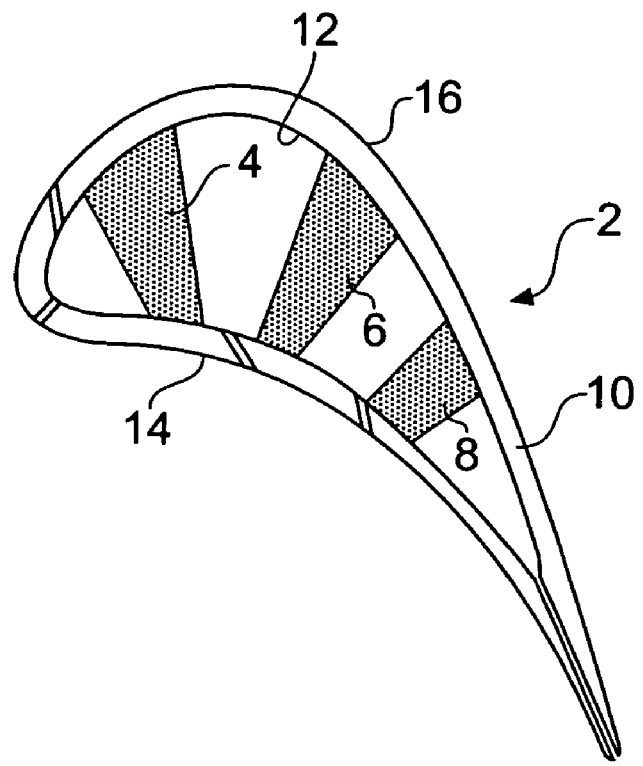
FIGS. 1 and 2 show two alternative cross-sections of the internal structure of a known internally cooled aerofoil designed according to prior art principles.

Referring now to the drawings where, in all figures, like parts carry like references.

Figure 2:
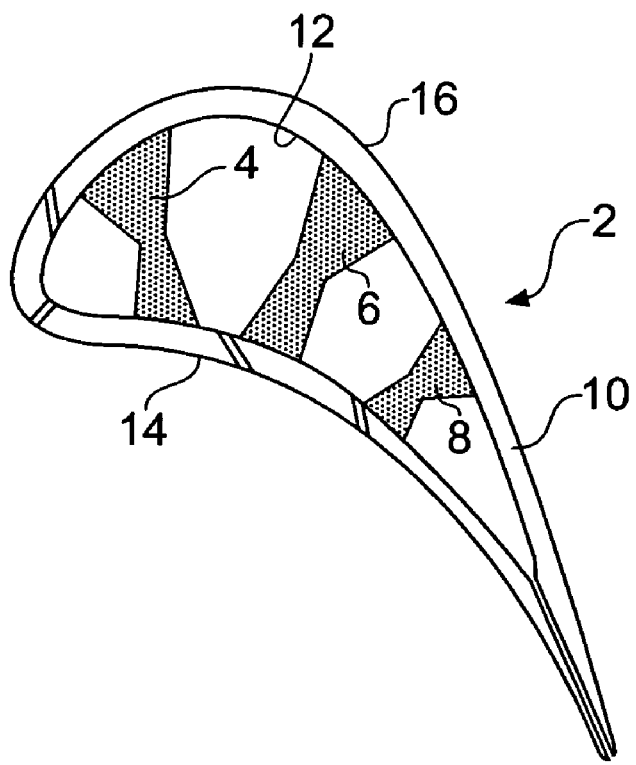

FIGS. 1 and 2 of the accompanying drawings illustrate mid-height cross-sections of two known turbine blade aerofoils. The turbine aerofoil generally indicated at 2, has internal cooling arrangements comprising a plurality of chambers formed by internal webs 4, 6 & 8 and connected in flow sequence by passages (not shown) located towards the base and tip of the aerofoil. In the casting process all of these passages and chambers are represented by solid parts of a ceramic die used to form them.

Clearly the integrity of the internal structure left when the ceramic die is removed is critical to aerofoil life. The remaining metal forms the internal support structure for the aerofoil outer wall 10. A variety of reasons, for example: ease of manufacture of the ceramic core, and limitations in the die moulding process, have had a strong influence on the design of the support structure rather than designing for maximum aerofoil life. The operating temperature profile through the aerofoil has a strong influence on aerofoil life so hitherto achievement of maximum aerofoil life has been achieved incidentally rather than being built into the aerofoil design.

Cooling fluid is employed to remove heat from the metal structure of the aerofoil through the surfaces over which it passes. The outer walls reach the highest temperatures and heat flows from them into the internal webs. Heat is lost from these webs according to, amongst other things, the excess temperature of the metal over the cooling fluid. However, the operational life of the metal structure is also dependent upon the time it spends at the highest temperatures. Principally, but not exclusively, the invention is concerned with the use of air as the cooling fluid; although it is known, for example in land-based and marine propulsion engines, to use water and steam. The principles embodied by the present invention continue to apply in such circumstances.

In such known designs most of the metal of the webs 4, 6 and 8 have been positioned close to external surface 10 of the aerofoil. That is, in FIGS. 1 and 2 the internal webs 4, 6, and 8 are thickest adjacent the internal surface 12 of the outer wall 10. In the aerofoil of FIG. 1 the webs 4, 6 and 8 are thickest adjacent the suction surface 16, which is the hotter than the pressure surface 14. In the aerofoil of FIG. 2 the webs 4, 6 and 8 of the internal structure are thickest adjacent both the pressure and suction surfaces 14 and 16 respectively and taper towards the central region of the aerofoil.

These known blade designs have an inherent drawback in that the distribution of metal in the internal support structure does not achieve the lowest possible mean temperature of the blade material. As a result the aerofoil creep life is not as great as it could be because heat from the aerofoil walls passes into the load bearing structure before being extracted by the cooling air. It is an objective of the present invention to overcome this drawback by providing for an internal aerofoil support structure that lowers the mean temperature of the metal and thereby increases the life of the aerofoil.

In shrouded turbine arrangements, forces generated by the mass of the shrouds carried by the tips of the turbine blades have to be reacted by the internal structure and transferred through the blade roots to the disc. The structure thus has to be sufficiently strong to carry these loads. In shroudless blade designs it is generally unnecessary to have such a massive internal structure, because shroud loads are absent, so that it may be reduced and redistributed with beneficial effect.

With reference to the remaining figures of the drawings, according to the present invention the thickest parts of the load carrying members comprising the internal structure are located about mid-way between the pressure and suction surfaces of the blade and up to about mid-height, and the said members are thinnest adjacent the inner surfaces of the outer wall. Consequently heat from the outer wall of the turbine blade flows into the internal support structure through the interface between them. Reduction of the area of this interface has the effect of reducing the amount of heat passing into the internal support structure. Detailed measurements of temperature distribution in the aerofoil internal support structure have indicated that the shape of the cold webs does not have a significant effect on the cooling efficiency of the system. That is, for a given cross-sectional area of a cooling passage, the perimeter (and hence hydraulic diameter) may change a little. However, reducing the mean temperature of the support structure significantly improves the creep life of the component.

It is an objective of the present invention to adopt as a design principle the proposition that material in an aerofoil blade may be better used by distributing it in such a way as to reduce mean metal temperature. Recent advances in manufacturing techniques have made it possible to relax the hitherto rigid requirement for draw/withdrawal angles.

This design principle may be expressed as positioning more of the metal (or material) towards the centre of the cooled aerofoil structure relative to its periphery thus achieving a lower mean metal temperature. This increases cooling effectiveness for a given coolant condition/mass flow. In the described embodiments, the creep life of the blades has been improved at the same operating temperature using the same cooled surface area, cooling passage cross-section area and cooling fluid velocity.

A reduced mean metal temperature increases the load carrying capacity of the aerofoil structure. In particular a blade structure designed according to this principle has a greater creep life. Alternatively, the same mean metal temperature may be obtained using less coolant flow, or the operating temperature may be increased for the same blade life.

In one form of the invention illustrated in the remaining figures of the drawings the cross-sections of the support members have a profile that is tapered towards the outer aerofoil wall. The support members are tapered towards the outer wall on both the pressure and suction sides of the aerofoil. Also the internal structure is reduced in mass towards the blade tip compared to the blade foot. The term foot is used here and in the claims as a generic reference to that portion of a blade by which it is carried in or attached to the circumference of the rotor disc. Thus, foot may be interpreted broadly for example as comprising a conventional fir-tree root, as in the example described below, as a root having a different profile form, or as a stub section by which the blade is welded to the disc periphery for instance by friction welding.

Figure 3A:
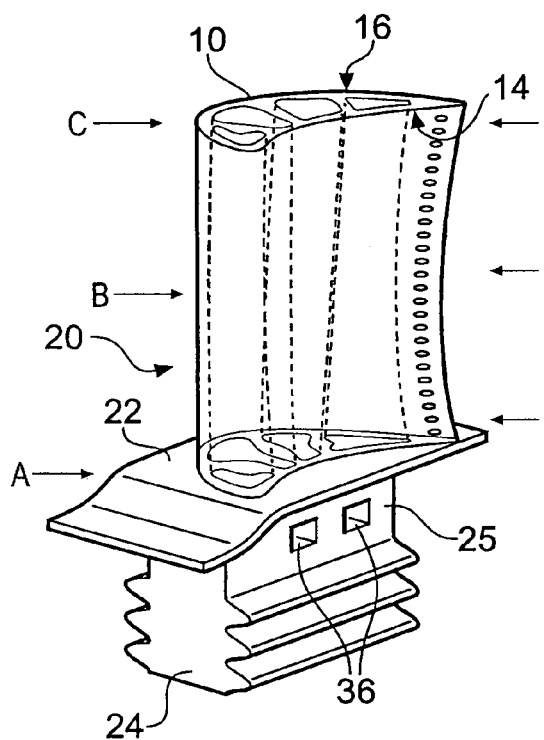
FIGS. 3a, 3b and 3c show a perspective view of a shroudless turbine blade according to the invention, views of a root cross-section, a mid-height cross-section and a tip cross-section, and a cross-sectional view of the root cross-section, a mid-height cross-section and a tip cross-section, respectively.
Figure 3B:
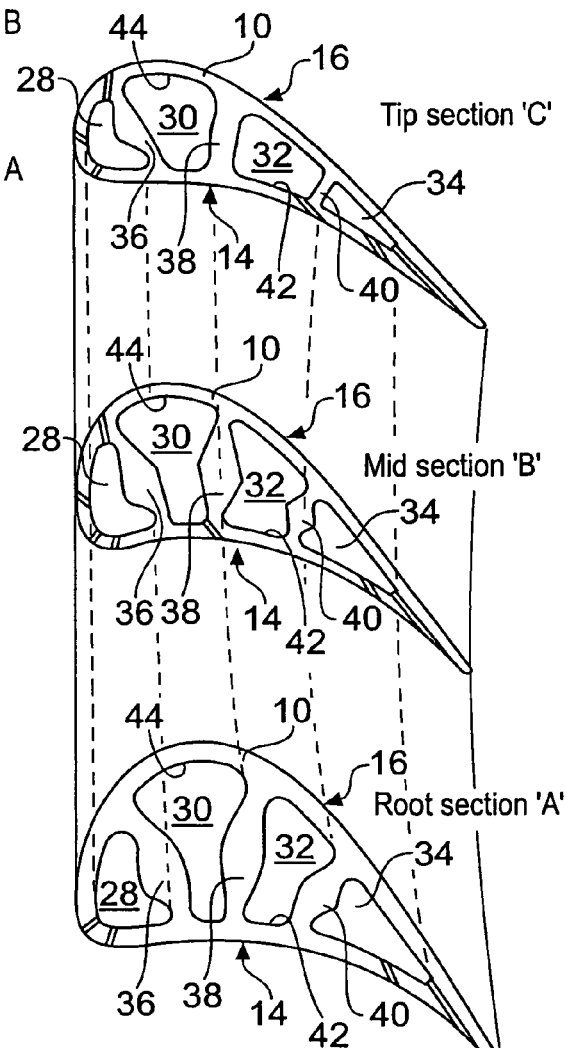
Figure 3C:
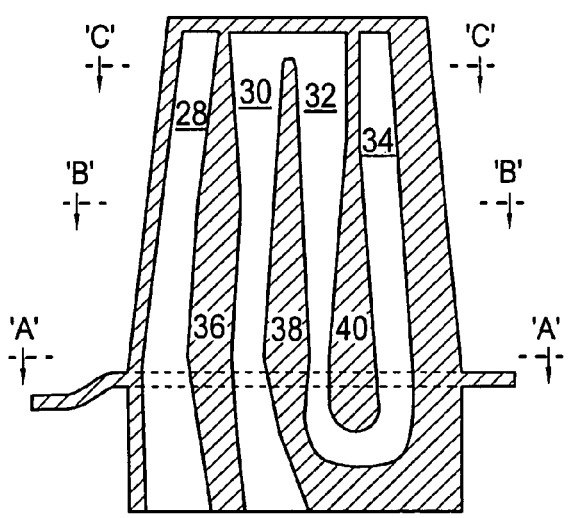

Referring now in particular to FIG. 3 an internally cooled, shroudless gas turbine blade embodying the present invention is illustrated in perspective view together with three cross-section views at the root, mid-height and tip regions. The blade comprises an outer wall 10 of aerofoil-shaped profile, having pressure and suction surfaces 14, 16 as before. An aerofoil section of the blade, generally indicated at 20, rises in a radial direction from a blade platform 22 and a firtree-shaped root 24. The root 24 is adapted for mounting on the periphery of a disc (not shown) in a slot of corresponding form. The fir-tree root is exemplary only and other root forms may be utilised as preferred. The form of blade root does not comprise an essential feature of the present invention. In fact it is not essential that the blade has a root, in the conventional sense, and the invention may be utilised in conjunction with bladed discs, i.e., rotor assemblies in which the blades are permanently joined, or formed integrally with, the rotor disc.

The aerofoil shaped section 20, the root 24 and the platform 22 are cast integrally using an investment casting process. The internal cooling passages 28, 30, 32 and 34 are formed by an existing manufacturing technique which uses a complex, soluble ceramic core suspended inside the ceramic mould so that the spaces between the core parts form the members of the internal supporting structure. In order to provide communication with the internal passages 28, 30, 32, 34 air entry orifices 36 are formed in a shank part 25 of root 24. In a modified design (not shown) the orifices 36 are formed in the base of the root section 24.

The outer wall 10 is supported by an internal structure consisting of internal load carrying webs or members 36, 38 and 40 carried by, or preferably formed integrally with, the root 24. These webs may extend the full height of the blade integrally from the root 24 towards the tip of the blade. But because the mass of the blade is distributed over its height the supporting structure does not need to have as great a load carrying capacity at the tip as it does at the root. Thus the strength and therefore the dimensions of the individual members 36, 38, 40 of the supporting structure may be reduced from blade root to blade tip. Typically the full dimensions of the load carrying members 36, 38, 40 are maintained from the root up to about half the height of the blade and tapered from about mid-height in the radial direction. In the illustrated example this will be apparent by comparing the dimension in the cross-sections included in FIG. 3. The dimensions of members 36, 38, 40 are substantially the same in the root section A and the mid section B. But, by comparison the same members have reduced dimensions in tip section C.

In another example, not shown, the dimensions of the load carrying members 36, 38, 40 are tapered in the radial direction from about the root to section C. In that case the dimensions of the members progressively reduces with height and are less in the mid section, and further reduced in the tip section.

The support members 36, 38, 40 contact the inner surface of the outer wall 10 along their length. They may extend along the entire length of the blade, and divide the interior of the aerofoil into the cooling chambers 28, 30, 32, 34. The dimensions of the members 36, 38, 40 are thinnest adjacent the inner surfaces 42, 44 of the pressure and suction surfaces 14, 16 respectively, and are thickest towards the centre region of the aerofoil approximately mid-way between the pressure and suction surfaces.

As illustrated the load carrying members 36, 38, 40 each have a straight-sided profile in which reach their thinnest or narrowest points adjacent the inner surfaces of the outer wall 10. The cross-section areas of the cooling passages 28, 30, 32, 34 remain substantially constant with radial height above the root portion. The cross-section dimensions of a turbine blade generally reduce with increasing radial height above the platform, and in this instance the reduction is achieved through reduction in the dimensions of the metal parts, especially the support members 36, 38, 40.

Advantage may be taken in this arrangement to increase the area in a given cooling arrangement of the inner surface 42, 44 of the outer wall 10 exposed to the cooling air thereby contributing, amongst other factors, to improving the efficiency with which they heat can be removed from the hot external wall 10.

In the internal structure in FIGS. 3a and 3b the load carrying members have a curved, blended profile towards their thinnest points adjacent the inner surfaces of the outer wall. In alternative arrangements, for example as shown in FIGS. 4, 5 and 6, the internal structure may have a straight profile.

If necessary as part of the structural design of the internal webs, in order to increase their load carrying capacity the dimension of the centre region of one or more of the members may be increased to accommodate extra-thick portions, which extend the full height of the webs. One such portion is depicted at 46 towards the middle of the cross-section of the web 38 in FIG. 4 representing a cross-section in a lower part of a blade between the root and mid-height sections corresponding to the sections A and B in FIG. 3b. The web is wider, that is, lengthened in the chordal direction in the centre of the blade in order to increase its load-carrying capacity. The shape of the widened part of such a web may be chosen for best effect in the particular aerofoil design, the shape of the webs is not a feature of the invention itself. The important element is that a greater proportion of the mass of the web is positioned away from the hot external wall 10 by extra material added at the coldest part of the web to increase the beneficial effect of cooler load-carrying metal.

Figure 4:
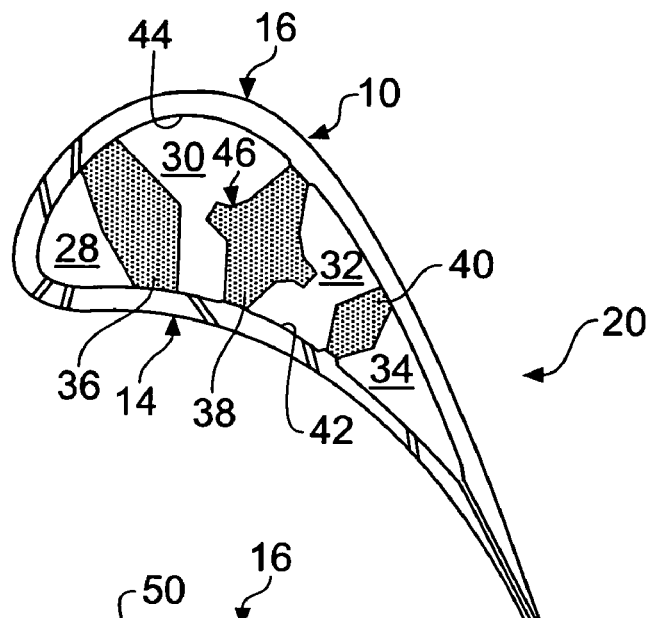
FIGS. 4, 5 and 6 show cross-sections of further examples of a turbine blade according to the invention.
Figure 5:
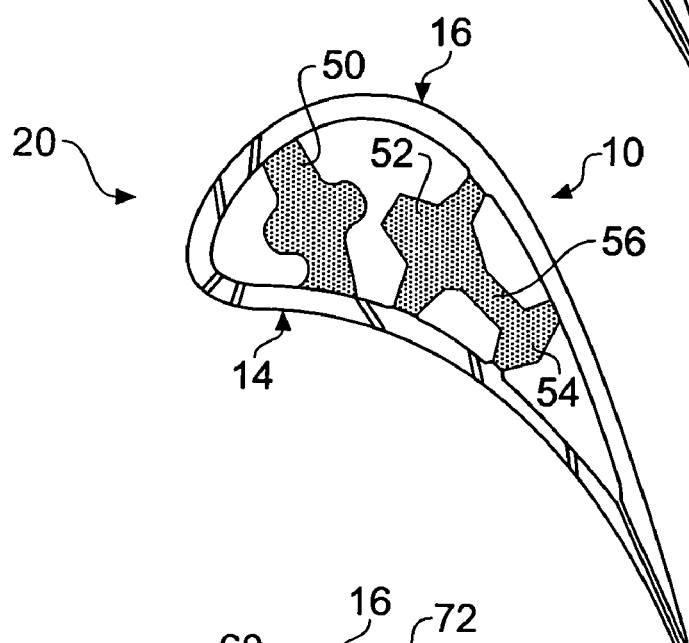
Figure 6:
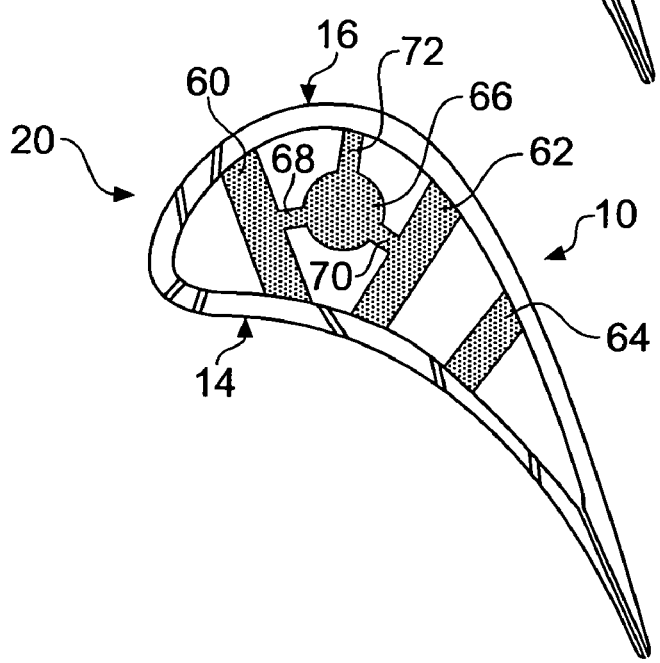

Further examples of internal cooling designs are illustrated by the cross-sections shown in FIGS. 4, 5 and 6. In both of these further developments material is also added to the cooler, central parts of the webs.

The example of FIG. 5 comprises three webs 50, 52 and 54 arranged much as in the previous design of FIGS. 3a and 3b. The central parts are enlarged to increase their load-carrying capacity to the extent that two adjacent webs 52 and 54 touch. The central parts may be enlarged until they merge, depending on manufacturing constraints, to form an integral connecting the two adjacent webs. As before the material is distributed to ensure that the "width" of the cold webs are wider away from the external walls and thinner on the external walls.

In another example shown in FIG. 6 the cool material is distributed more effectively by having an additional cold web. As shown in FIG. 6 the internal structure comprises internal webs 60, 62 and 64 located in the same positions as before. These webs may be parallel, convex or concave. An additional load-carrying member 66, which extends from the root section towards the aerofoil tip, is disposed in the coolest part of the aerofoil interior. The member 66 is linked to the adjacent webs 60, 62 by walls 68, 70 and to the outer wall by a further wall 72 to ensure that load is transferred between said additional web 66 and the rest of the aerofoil. In FIG. 6, three linking walls are shown for illustrative purposes only. It may be appropriate to use one or more of these to link to one or more of the external surfaces and/or one or more of the internal cold webs. Also the webs may be formed with an enlarged central region, as previously described above.

The invention claimed is:

1. An internally cooled gas turbine aerofoil comprising:
   a tip;
   a foot; and
   a hollow aerofoil profiled section rising in a radial direction from the foot toward the tip, the hollow aerofoil profiled section including:
   an outer wall defining pressure and suction surfaces, as well as inner surfaces,
   an internal structure supporting the outer wall, the internal structure including load carrying members carried by or formed integrally with the foot,
   the load carrying members dividing an interior cavity of the aerofoil section into a plurality of cooling passages, wherein
   the load carrying members are thinnest adjacent the inner surfaces of the outer wall at least up to mid-height of the aerofoil and thickest about mid-way between the pressure and suction surfaces to reduce heat transfer from the outer wall to the load carrying members during operation, and
   a cross-sectional area of the load carrying members is tapered so as to be progressively reduced in the radial direction from about the foot to about the tip.

2. The internally cooled aerofoil as claimed in claim 1, wherein the load carrying members have a straight-sided profile towards thinnest points adjacent the inner surfaces of the outer wall.

3. The internally cooled aerofoil as claimed in claim 1, wherein the load carrying members have a curved, blended profile towards thinnest points adjacent the inner surfaces of the outer wall.

4. The internally cooled aerofoil as claimed in claim 1, wherein a cross-sectional area of the cooling passages remains substantially constant with increasing radial height above the foot toward the tip.

5. The internally cooled aerofoil as claimed in claim 1, wherein the aerofoil comprises a shroudless turbine blade.

6. The internally cooled aerofoil as claimed in claim 1, wherein the load carrying members have an angular profile towards a mid-section of the aerofoil.

7. The internally cooled aerofoil as claimed in claim 1, wherein the internal structure includes a circular load carrying member.

8. The internally cooled aerofoil as claimed in claim 7, wherein the circular load carrying member is between two of the load carrying members and the outer wall.

9. An internally cooled gas turbine aerofoil comprising:
a foot; and
a hollow aerofoil profiled section including an outer wall defining pressure and suction surfaces, the outer wall being supported by an internal structure including load carrying members carried by or formed integrally with the foot, the load carrying members dividing an interior cavity of the aerofoil profiled section into a plurality of cooling passages, dimensions of the load carrying members being thinnest adjacent inner surfaces of the outer wall and thickest up to about mid-height of the aerofoil, and the dimensions being progressively reduced in a radial direction with increasing radial height from about the mid-height of the aerofoil so as to reduce heat transfer from the outer wall to the load carrying members and to reduce centrifugal forces during operation.

10. The internally cooled aerofoil as claimed in claim 9, wherein the load carrying members have an angular profile towards the midheight of the aerofoil.

11. An internally cooled gas turbine aerofoil comprising:
a tip;
a foot; and
a hollow aerofoil profiled section rising in a radial direction from the foot toward the tip, the hollow aerofoil profiled section including:
an outer wall defining pressure and suction surfaces,
an internal structure supporting the outer wall, the internal structure including load carrying members carried by or formed integrally with the foot,
the load carrying members dividing an interior cavity of the aerofoil profiled section into a plurality of cooling passages, wherein
the load carrying members are thinnest adjacent inner surfaces of the outer wall at least up to mid-height of the aerofoil and thickest about mid-way between the pressure and suction surfaces to reduce heat transfer from the outer wall to the load carrying members during operation, and
a cross-sectional area of the hollow aerofoil profiled section and a cross-sectional area of the load carrying members are tapered so as to be progressively reduced in the radial direction with increasing radial height from about the foot.

12. The internally cooled aerofoil as claimed in claim 11, wherein the load carrying members have an angular profile towards the mid-height of the aerofoil.

13. The internally cooled aerofoil as claimed in claim 11, wherein the internal structure includes a circular load carrying member.

14. The internally cooled aerofoil as claimed in claim 13, wherein the circular load carrying member is between two of the load carrying members and the outer wall.

* * * * *